June 26, 1923.

Re. 15,636

S. A. BEYLAND

TELEPHONE SYSTEM

Original Filed June 23, 1915

3 Sheets-Sheet 1

INVENTOR
SIDNEY A. BEYLAND
BY D. Clyde Jones
ATTORNEY

June 26, 1923.

Re. 15,636

S. A. BEYLAND

TELEPHONE SYSTEM

Original Filed June 23, 1915

3 Sheets-Sheet 2

INVENTOR
SIDNEY A. BEYLAND

BY D. Clyde Jones.

ATTORNEY

June 26, 1923.

Re. 15,636

S. A. BEYLAND

TELEPHONE SYSTEM

Original Filed June 23, 1915

3 Sheets-Sheet 3

INVENTOR
SIDNEY A. BEYLAND
BY D. Clyde Jones
ATTORNEY

Reissued June 26, 1923.

Re. 15,636

UNITED STATES PATENT OFFICE.

SIDNEY A. BEYLAND, OF LONG MEADOW, NEW YORK, ASSIGNOR, BY MESNE ASSIGNMENTS, TO STROMBERG-CARLSON TELEPHONE MANUFACTURING COMPANY, OF ROCHESTER, NEW YORK, A CORPORATION OF NEW YORK.

TELEPHONE SYSTEM.

Original No. 1,298,441, dated March 25. 1919, Serial No. 35,757, filed June 23, 1915. Application for reissue filed March 26, 1921. Serial No. 455,987.

*To all whom it may concern:*

Be it known that I, SIDNEY A. BEYLAND, a citizen of the United States, residing at Long Meadow, county of Monroe, and State of New York, have invented certain new and useful Improvements in Telephone Systems; and I do hereby declare the following to be a full, clear, and exact description of the invention, such as will enable others skilled in the art to which it appertains to make and use the same.

My invention relates to improvements in telephone systems, and has for one of its objects the provision of means for releasing the ringing controlling means for further use, after the ringing connections has been completed.

Another object of my invention is to accomplish the above named object in connection with apparatus for automatically signaling a subscriber, and also for placing such means under the control of the calling switch.

Other objects of my invention will be clear from a description of an embodiment of the invention.

Fig. 3 is a second modification of the embodiment shown in Fig. 1.

Figure 1:
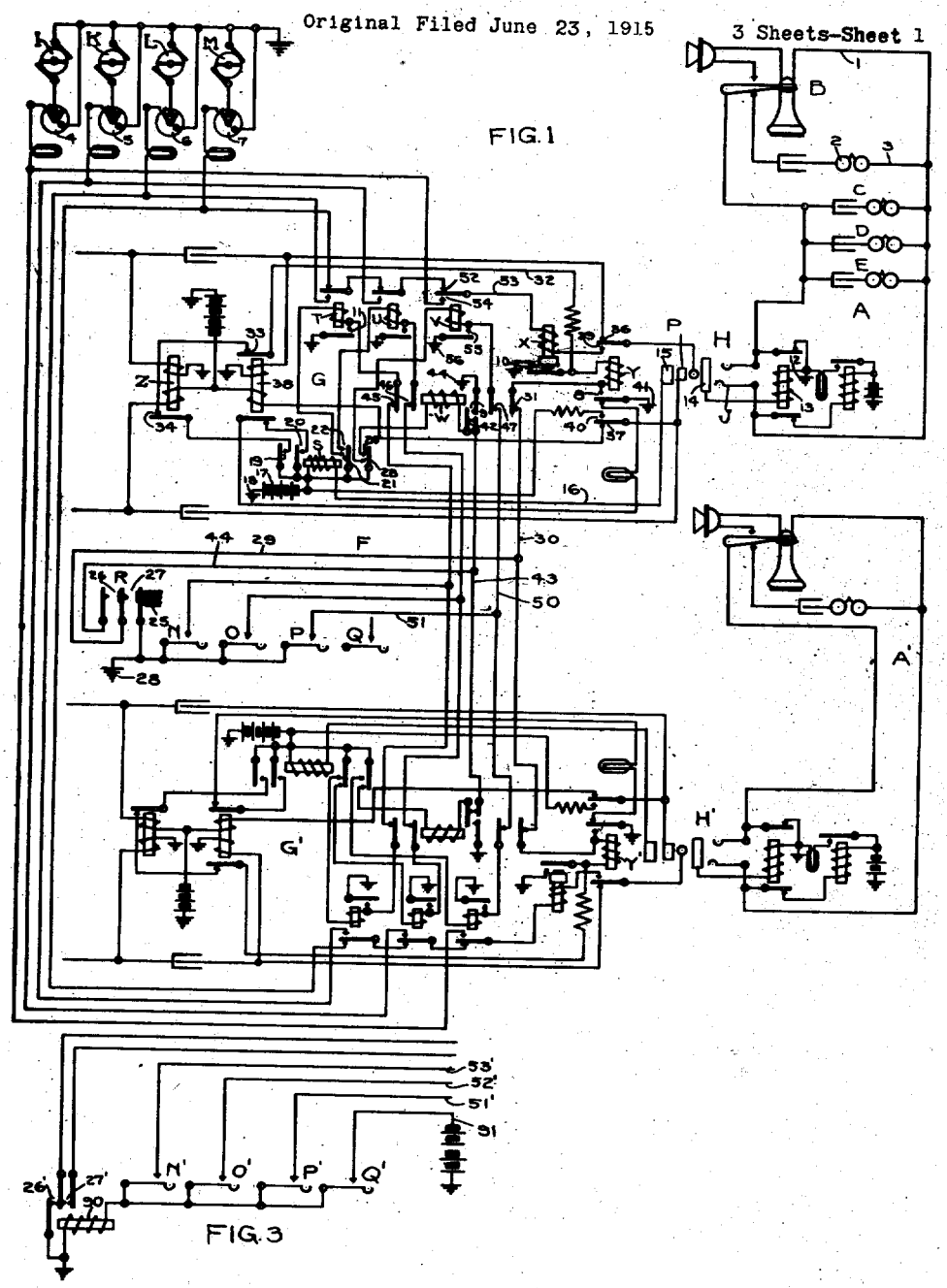
Figure 1 shows diagrammatically an embodiment of my invention.

Referring now to the drawings and to the embodiments of my invention illustrated therein, and first to the embodiment shown in Fig. 1, at A is shown a telephone line which will be spoken of in this specification as the called line, leading from a plurality of stations B, C, D and E. Any suitable number of stations may be connected to this line, four having been shown for convenience. Each substation is equipped with talking apparatus and signaling apparatus. The talking apparatus is connected in a bridge 1 and the signal, here shown as a bell, is connected in the bridge 3. The line terminates at a main station F.

Means are provided at the main station for connecting telephone lines together, such as connecting links, here illustrated as a cord circuit G, a portion only of which is illustrated in the drawing. Switching means, shown at H, are provided for connecting the cord to the telephone line. In the embodiments illustrated, this switching means consists of plugs and jacks, illustrated at *p* and J, respectively, in Fig. 1. A plurality of sources of signaling current, here shown as generators I, K, L and M, are employed for operating the signals at the substations. The signals at the substations may be so constructed that they respond to one particular character of current only, and the generators may be so constructed that they will select and operate the signals at the substations. Conductors are provided for connecting the sources of current to the line. Commutators 4, 5, 6 and 7 may be connected in these conductors for the purpose of intermittently associating the sources with the signal so as to cause the operation of the signal at intervals of time. Signal controlling means are shown at N, O, P and Q, here illustrated as ringing keys, controlling the connection of the sources, I, K, L and M in the signaling circuit.

A master key or switch is shown at R, which is operated whenever any of the keys N, O, P or Q is operated. Relays are shown at Z, S, T, U, V, W, X and Y. When it is desired to connect the source M with the called line, the switch H is operated by inserting the plug *p* into the jack J. The key Q is then operated, operating at the same time the key R and closing a circuit for the relay Y through the contacts of the relay W, the contacts of the key R and the contacts of the relay S, which was energized when the switch H was operated. The relay Y will be energized, interrupting the cord circuit and connecting the source of current M to the called line. At the same time, the relay Y completes a locking circuit for itself, through the switch 8.

When the master key R is operated, a circuit will be completed for the relay W, which will disconnect the battery of keys N, O, P, Q and R from the cord G and complete a locking circuit for itself through the switch 9. The relay W is so adjusted, that it does not operate until after the relay Y has operated. It will thus be seen that the bank of keys will now be relieved of further service with the cord circuit G during this connection and may be used in connection with the cord circuit G′ for making connections with another telephone line A′, if such connection is desired, thus enabling me to use one bank of keys for a whole position. The ringing takes place automatically until the subscriber responds, when the flow of current through the relay X will be such as to cause it to close a switch 10 and shunt the relay Y, which will release its armature, opening the ringing circuit and reforming the cord circuit. When the conversation has been completed and the operator has withdrawn the plug *p* from the jack J, the relay S will be deënergized and the system restored to normal.

If the subscriber wanted is provided with a signal which responds to current from the generator L, the operator, after closing the switch H, operates the key N, which will complete a circuit for the relay T, which being energized, will connect the source L in the ringing circuit, excluding the source M. The relay T will also lock itself up through a switch 11. Otherwise, the operation will be the same as previously described. When the key O is operated, the relay U will be energized, connecting the source K in the signaling circuit. When the key P is operated, the relay V will be energized, connecting the source I in the circuit.

Perhaps the invention will be better understood from a detailed description of the operation of the embodiment shown in Fig. 1. The operator having received a call over a calling line, not shown, and elected to use the cord circuit G, connects the end of that particular cord circuit, not shown, with the calling line and learns the subscriber desired. Assuming that it is the subscriber at B that is wanted, and that the signal 2 responds to the character of current produced by the generator M, the operator after testing the line A and finding it, as we shall assume, idle, inserts the plug *p* into the jack J, completing a circuit for the relay S as follows: ground at 12, cut-off relay 13—contact 14—contact 15—conductor 16—S—battery 17—to ground 18. The relay S will be energized, closing the switches 19, 20, 21, 22, 23 and 24. The operator then actuates the key Q, which through some such member as a swinging plate, a portion of which is illustrated at 25, closes the switches 26 and 27 of the key R. A circuit is thus completed for the relay Y, as follows: ground at 28—switch 27—conductor 29—conductor 30—switch 31—relay Y—conductor 32—switch 33—switch 34—switch 19—battery 17—to ground 18. The relay Y becomes energized, opening a switch 36 in one of the talking strands of the cord circuit and a switch 37 in the circuit of the relay 38. The relay Y closes switches 39 and 40 in the signaling circuit and the switch 8, completing a locking circuit for itself independently of the key R. This circuit is traced from ground 41 through the switch 8, the relay Y to and through the battery 17, as previously described.

At the time the key R was operated, a circuit was completed for the relay W, which is adjusted to respond after the operation of the relay Y. The circuit for the relay W thus completed is as follows: ground 18, 17—switch 24—, W—switch 42—conductor 43—conductor 44—key R to ground 28. The relay W will be energized, closing the switch 9 and thereafter opening the switch 42 and interrupting its connection with the conductor 43. Closing the switch 9 completes a locking circuit for the relay W from ground 44—through 9—the relay W and over the circuit as previously traced. The relay W also opens switches 45, 46, 47 and 31, completely disconnecting the bank of keys N, Q, P, Q and R from the cord circuit G, thereby releasing the keys for use in connection with another cord circuit, for example, cord circuit G′. However, if after the operation of the switch H′ the key Q were operated, a circuit would be completed for the relay Y′ and the source of current M would be connected to the line A′ in the same manner as described in connection with the cord G and the line A. If it is desired to operate the signal at C, the key P is operated, thereby completing a circuit for the relay V as follows: 18—17—switch 23—V—switch 47—conductor 50—conductor 51—key P to ground 28. The relay V is energized, opening the switch 52 and disconnecting the source M from the conductor 53 and closing a switch 54, thereby connecting the generator I to the conductor 53. The relay V also closes a locking circuit for itself, by closing the switch 55, such locking circuit being from ground 56, through switch 55 and the circuit for V, as previously traced. The closing of the switch R will in the same manner cause the energization of the relays W and Y and the operations with respect to these relays will be the same as before.

In case it is the subscriber D that is wanted, the key O is actuated, which will complete a circuit for the relay U. The operation will be the same as before, except that the source K will be connected in the signaling circuit. Should it be desired to operate the signal at E, the key N is actuated, which would complete a circuit for the relay T in the same manner as was described for the relays U and V, the source L being this time connected in the signaling circuit. No matter which of the sources is connected in the signaling circuit, its controlling commutator will intermittently associate and disassociate it with the calling line, so that current will be intermittently applied to such line to selectively operate the desired signal. Current flowing through the relay X will, however, not be enabled to operate such relay until the subscriber responds, placing the low resistance bridge, such as illustrated at 1, across the line and admitting such a flow of current that the relay X will be operated, closing a shunt 10 about the relay Y, which will relase its contacts, interrupting the signaling circuit and restoring the talking circuit. At the end of the conversation, the operator at F withdraws the plug *p* from the jack J, when the system will be restored to normal, the relay W being deënergized when its circuit is interrupted by the opening of the switch 24, which occurs when the relay S is deenergized, owing to the interruption of its circuit by the opening of the switch H. The deenergization of the relay W again associates the bank of keys with the cord circuit G.

Figure 2:
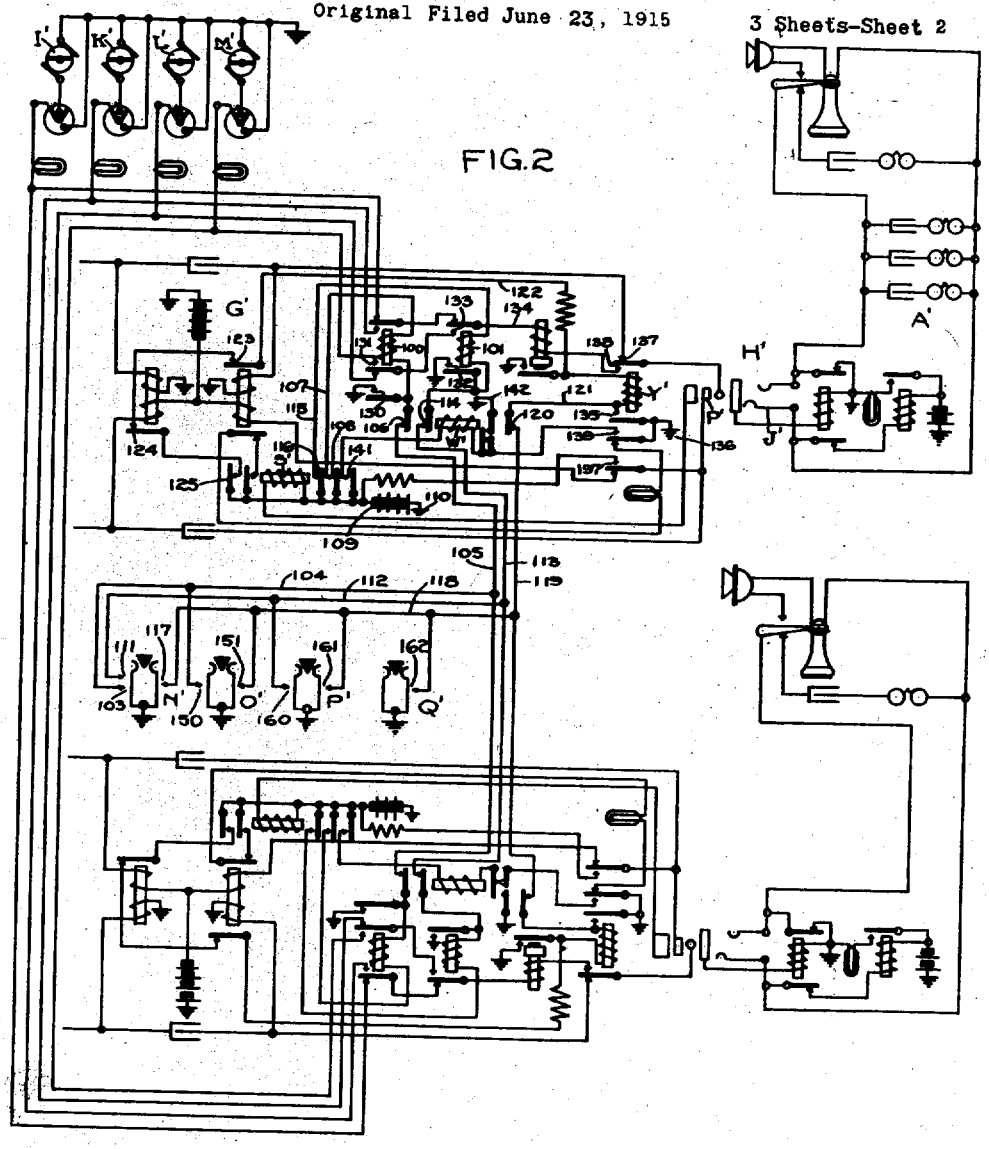
Fig. 2 is a modification of the embodiment shown in Fig. 1.

In the embodiment shown in Fig. 2, the key $N_1$ is operated when it is desired to employ the source $M_1$ for signaling. When $N_1$ is operated, the relay 100, 101 and $Y_1$ will be energized over the following circuits: for the relay 100, ground 102—switch 103—conductor 104—conductor 105—switch 106—relay 100—conductor 107—switch 108—battery 109—to ground 110; for the relay 101, as follows—ground 102—switch 111—conductor 112—conductor 113—switch 114—relay 101—conductor 115—switch 116—battery 109—to ground 110; for the relay $Y_1$, as follows—ground 102—switch 117—conductor 118—conductor 119—switch 120—conductor 121—$Y_1$—conductor 122—switch 123—switch 124—switch 125—battery 109—to ground 110. All three of these relays will be actuated, the relay 100 closing a switch 130 and completing a locking circuit for itself and closing a switch 131 in the connections of the source $M_1$. The relay 101 closes a switch 132, completing a locking circuit for itself and a switch 133, completing the connection of the source $M_1$ to the conductor 134. The relay $Y_1$ closes a switch 135, completing a locking circuit for itself to ground 136, interrupts one of the talking strands at 137 and completes the ringing circuit at 138 and 197. This relay also closes a switch 139 in the circuit of the relay $W_1$, which is energized from ground 136—switch 139—relay $W_1$—switch 141—to ground 110. The relay $W_1$ completes a locking circuit for itself through the conductor 142 and disconnects the bank of keys from the cord circuit by opening the switches 106, 114 and 120.

When it is desired to connect the source $K_1$ to the called line, the key $O_1$ is operated thereby causing the energization of the relay 100 over the same circuit as previously described, except that it will now include the switch 150 instead of the switch 103. A circuit would also be completed for the relay $Y_1$ through the switch 151 instead of 117. The relay 100 will be energized, closing the switch 152 and connecting the generator $K_1$ in the circuit. When it is desired to connect the generator $L_1$ in the circuit, the key $P_1$ is actuated, completing circuits for the relays 101 and $Y_1$, through the switches 160 and 161, respectively, and when it is desired to connect the source $I_1$ in, the key $Q_1$ is operated, completing a circuit for $Y_1$ through the switch 162. With either source connected, the automatic ringing will be substantially the same as previously described, and the system will be restored to normal when the plug $p_1$ is withdrawn from the jack $J_1$, thereby reconnecting the bank of keys to the cord circuit $G_1$.

In the embodiment shown in Fig. 2, it will be noted that no master key is employed, and that the circuit connections are controlled through the actuation of the individual keys alone. It will also be noted that the circuit of the key disconnecting relay $W_1$ is completed by the relay $Y_1$ instead of being controlled by the master key.

In Fig. 3 instead of employing a mechanically actuated master key, a relay 90 is employed which controls the switches 26′ and 27′. Each of the keys N′, O′, P′ and Q′ control a circuit for the relay 90 through the conductors 91—51′—52′ and 53′, the conductors 51′, 52′ and 53′ being connected to the source 17 (when the relay 90 is employed), as illustrated in Fig. 1.

Figure 4:
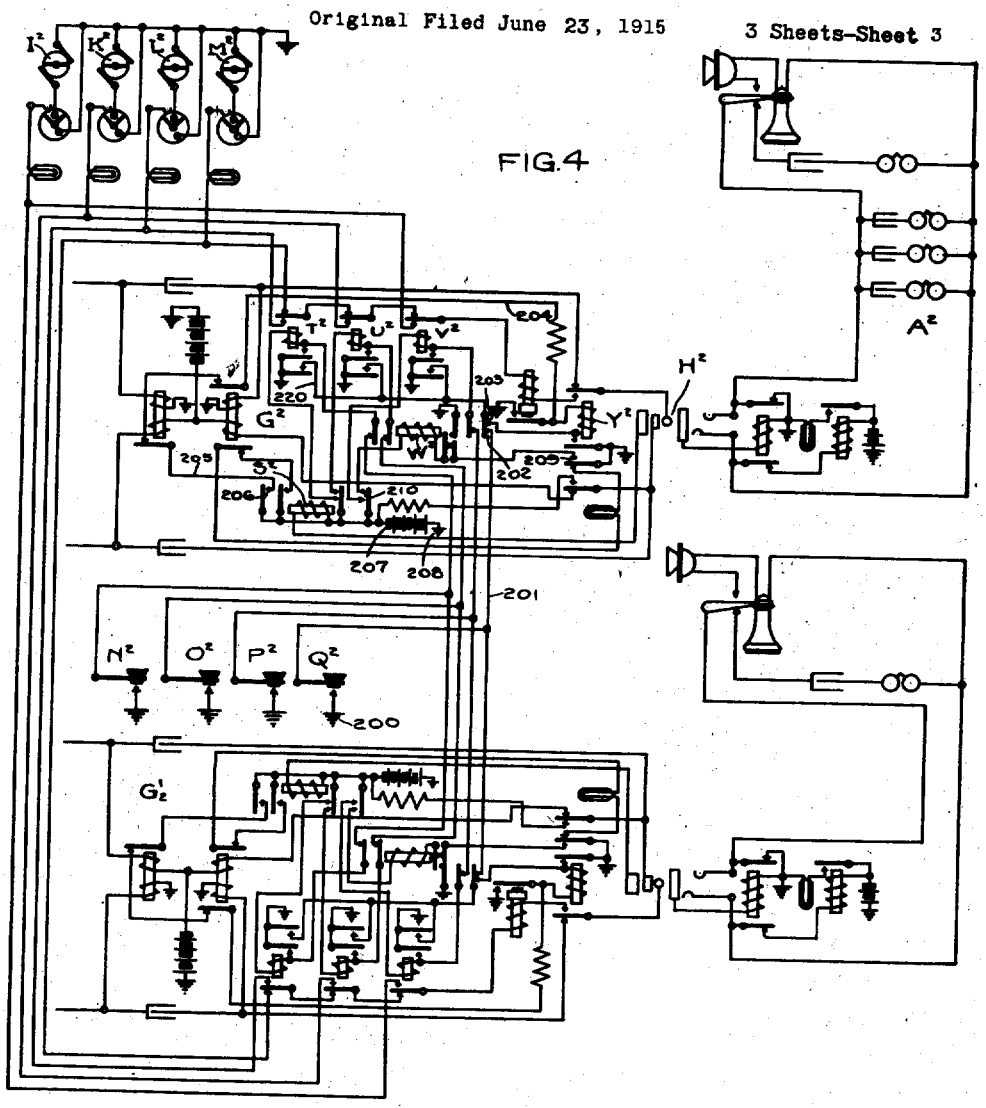
Fig. 4 is a third modification of the embodiment shown in Fig. 1.

In the embodiment shown in Fig. 4, the keys are illustrated at $N_2$, $O_2$, $P_2$ and $Q_2$. When it is desired to connect the source $M_2$ in the ringing circuit, the key $Q_2$ is operated, closing a circuit for the relay $Y_2$ from ground 200, through conductor 201—switches 202 and 203, relay $Y_2$—conductor 204—conductor 205—now closed switch 206—battery 207—to ground 208. The relay $Y_2$ completes the ringing circuit as previously described and also a circuit for the relay $W_2$, through the switch 209, the switch 203 and the switch 210, which includes the source 207 and ground 208. The relay $W_2$ will disconnect the keys from the cord circuit, releasing them for use with other cords. When the conversation is terminated, the circuit of the relay $W_2$ will be broken when the relay $S_2$ is deenergized which will happen when its circuit is interrupted by the opening of the switch $H_2$, thereby reconnecting the keys to the cord circuit $G_2$. The generators $I_2$, $K_2$ and $L_2$ may be selected and connected in the ringing circuit instead of the generator $M_2$, through the operation of the keys $N_2$, $O_2$ and $P_2$ and their control over the relays $T_2$, $U_2$ and $V_2$. In each case, the circuit of the relay $Y_2$ will be closed through the operation of any one of these relays by the grounding of the conductor 220. In each case, as soon as the relay $Y_2$ is operated, it completes the signaling circuit and the circuit for the relay $W_2$, as previously described. In each case, the keys will be disconnected from the cord $G_2$ and reconnected thereto in the manner previously described.

In the bottom of Fig. 4 a second cord circuit $G'_2$ is shown, to illustrate how a cord circuit may be employed with the keys during the use of the cord circuit $G_2$ for signaling or talking. The cord circuit $G'_2$ is a duplicate of the cord circuit $G_2$ and its operation will be clear.

I have illustrated these embodiments of my invention and the details shown therein for the purpose of clearly describing my invention, and not that I wish to be limited thereto, as it will be apparent to those skilled in the art that numerous and extensive departures may be made from both the forms and details illustrated, without departing from the spirit of the invention.

I claim:

1. In a telephone system, the combination of a plurality of signaling circuit sections, each including a signal and another signaling circuit section, including a source of signaling current adapted to operate said signals, said last named section adapted to be connected to each of the plurality of first named sections and complete a signaling circuit, a signaling relay controlling each circuit, a circuit for each relay including contacts of a switch common to the relays and means controlled by said switch for removing said switch from the circuit of a signaling relay which has been operated.

2. In a telephone system, the combination of a signaling circuit, a source of signaling current, a relay controlling the connection of said source in said circuit, a circuit for said relay, a switch in said last named circuit and means controlled by said switch for disconnecting said switch from said relay while the source of signaling current is connected in the signaling circuit.

3. In a telephone system, the combination of a telephone line, a source of signaling current, means including a relay for connecting said source to said line, a switch normally connected to said relay controlling the same and a second relay controlled by said switch for disconnecting said switch from said first-named relay after the relay has been operated.

4. In a telephone system, the combination of a telephone line, a source of signaling current, means including a signaling relay controlling the connection of said source to said line, a signaling key normally connected to said signaling relay and controlling the same, a locking circuit for said relay closed when the same is operated, said locking circuit being independent of said key and a second relay controlled by said key and operated when the key is actuated to disconnect the key from the signaling relay.

5. In a telephone system, the combination of a telephone line, a source of signaling current, apparatus including a signaling relay for connecting said source to said line, a signaling key normally connected to said signaling relay, a second relay controlling the connection of said key to said signaling relay and a circuit for said signaling relay controlled by said signaling relay, said circuit being independent of the connection between the key and the signaling relay.

6. In a telephone system, the combination of a plurality of telephone lines, a plurality of cord circuits, a signaling relay associated with each cord circuit, a signaling key normally conditioned to exercise control over each signaling relay and means controlled by said key for removing from the control of said key each signaling relay which has been operated.

7. In a telephone system, the combination of a plurality of telephone lines, a plurality of cord circuits, a signaling relay associated with each cord circuit, a signaling key normally conditioned to exercise control over each signaling relay, means controlled by said key for removing from the control of said key each signaling relay which has been operated, and means for automatically restoring the normal association of said key with said relay when said relay is deenergized.

8. In a telephone system, the combination of a plurality of telephone lines, a plurality of cord circuits, a signaling relay in each cord circuit, a circuit for said relay, a switch common to said circuits, the circuit of each relay being closed up to the contacts of said switch when the cord circuit with which it is associated is connected to telephone lines and means for removing said switch from the circuit of a signaling relay which has been operated.

9. In a telephone system, the combination of a plurality of telephone lines, a plurality of cord circuits, a signaling relay in each cord circuit, a circuit for each relay, a switch common to all of said circuits, the circuit of each relay being closed up to the contacts of said switch when its associate cord circuit is connected to telephone lines, a second relay controlled by said switch for disconnecting said switch from a signaling relay which has been operated, and a locking circuit for said signaling relay independent of said switch and completed when said signaling relay is operated.

10. In a telephone system, the combination of a plurality of signaling circuits, a plurality of sources of signaling current, each adapted to be connected in each of said circuits, a signaling relay controlling each circuit, a switch common to said relays, a circuit for each relay including contacts of said switch, a second relay for removing the contacts of the switch from the circuit of a signaling relay which has been operated and a locking circuit for said signaling relay controlled by said signaling relay.

11. In a telephone system, the combination of a plurality of telephone lines, a signal on each line, a source of signaling current and means to connect said source to each line, a signaling relay controlling the connection of said source to each line, a circuit for each of said relays including contacts of a switch common to said relays, a second relay for removing the contacts of said switch from the circuit of a signaling relay which has been operated and a locking circuit for said signaling relay controlled by said signaling relay.

12. In a telephone system, the combination of a plurality of cord circuits, a signaling relay in each cord circuit, a signaling key common to said relays and normally capable of exercising control over said relays and mechanism controlled by said key for automatically removing a signaling relay from the control of said key.

13. In a telephone system, the combination of a plurality of line connecting means, a signaling relay associated with each line connecting means, a signaling key common to a plurality of signaling relays normally connected to said relays and mechanism controlled by said key for disconnecting said key from each of said relays.

14. In a telephone system, the combination of a plurality of cord circuits, a plurality of telephone lines, switches for connecting the cord circuits to the telephone lines, a signaling relay associated with each cord circuit, a key common to a number of cords connected to each of said relays and mechanism controlled by said switches and said key for disconnecting the key from the signaling relays.

15. In a telephone system, the combination of a plurality of telephone lines, a plurality of signaling circuits, each including a portion of a telephone line, a switch in each signaling circuit, electromagnetic means associated with each switch controlling each signaling circuit, a key normally connected to each of said electromagnetic means and apparatus controlled by said key and said switch for disconnecting said key from the electromagnetic means associated with the switch.

16. In a telephone system, the combination of a ringing circuit, a ringing relay controlling the same, a ringing key normally connected to the ringing relay, a second relay normally connected to the ringing key, said second relay controlling the connection of the ringing relay to the ringing key and a locking circuit for each of said relays.

17. In a telephone system, the combination of a ringing circuit, a ringing relay controlling the same, a ringing key, a conductor normally connecting the ringing key to the ringing relay, a second relay connected to the ringing key controlling said conductor and a switch in said ringing circuit controlling each of said relays.

18. In a telephone system, the combination of a ringing circuit, a ringing relay, a ringing key, a conductor normally connecting the ringing key to the ringing relay, a second relay controlling said conductor, each of said relays being controlled by said ringing key and a switch in the ringing circuit controlling each of said relays.

19. In a telephone system, the combination of a signaling circuit, a signaling relay controlling the circuit, a signaling key normally connected to said relay, a second relay controlled by said key adapted to disconnect the key from the signaling relay, a locking circuit for the second relay and a switch in the signaling circuit controlling the locking circuit for the second relay.

20. In telephone system, the combination of a main station, a telephone line leading to the main station, a signal on said line, a calling telephone line and substation apparatus thereon, link conductors for connecting telephone lines together, a signaling generator at the main station adapted to the connected to and to operate the signal on the telephone line, a relay associated with said link conductors controlling the connection of said generator to said signal, a key for controlling said relay and means operable independently of the substation apparatus for disassociating said key from said link conductors immediately after said key has been operated.

21. In a telephone system, the combination of a main station, a telephone line leading to the main station, a signal on the telephone line, link conductors for connecting telephone lines together at the main station, a ringing generator at the main station adapted to actuate the signal on the telephone line, a ringing key at the main station controlling the connection of the generator to said signal, said key normally having no control over the connection of the generator to such signal, means at the main station for placing the control of the generator over said signal under said key and manually controlled means for automatically releasing the key for use with other cord circuits as soon as the ringing generator has been connected to such signal.

22. In a telephone system, the combination of a plurality of telephone lines including a called line, a subscriber's signal on said called line, link conductors for connecting telephone lines together, a switch for connecting the link conductors to the called line, a source of current capable of supplying current to operate the signal on the called line, means for connecting said source to said switch and the called line and said signal, a key common to a plurality of cords adapted after said switch has been operated to control the connection of said source to said switch and mechanism controlled by said key for removing the control of the connection of said source to said switch from said key as soon as said source has been connected to said switch.

SIDNEY A. BEYLAND.